United States Patent [19]

Gregory et al.

[11] 3,846,762

[45] Nov. 5, 1974

[54] APPARATUS FOR OPTIMAL DATA STORAGE

[75] Inventors: John G. Gregory, White Marsh; Robert M. Trepp, Laurel, both of Md.

[73] Assignee: Westinghouse Electric Corporation, Pittsburgh, Pa.

[22] Filed: Aug. 10, 1973

[21] Appl. No.: 387,417

[52] U.S. Cl. .......... 340/172.5
[51] Int. Cl. .......... G06f 3/05
[58] Field of Search .......... 340/172.5

[56] References Cited

UNITED STATES PATENTS

| | | | |
|---|---|---|---|
| 3,345,608 | 10/1967 | Brown et al. | 340/172.5 X |
| 3,376,557 | 4/1968 | Godinez | 340/172.5 |
| 3,387,282 | 6/1968 | Jacques | 340/172.5 |
| 3,480,931 | 11/1969 | Geissler et al. | 340/172.5 |
| 3,665,417 | 5/1972 | Low et al. | 340/172.5 |
| 3,681,756 | 8/1972 | Burkhard | 340/172.5 |

*Primary Examiner*—Harvey E. Springborn
*Attorney, Agent, or Firm*—D. Schron

[57] ABSTRACT

This invention relates to apparatus for optimally storing data. Analog and digital data processing techniques may be employed with a scratch pad memory to convert input analog data signal samples to digital signals and then back to analog signals to be recorded by a magnetic storage medium with the effect of increasing the analog bandwidth of the analog data signals to match the maximum available bandwidth of the storage medium. By utilizing wide band performance techniques, more storage space, in effect, can be allocated to storing data. The analog data in the storage medium may then undergo postprocessing to be utilized to either reconstitute the input analog data signals or to be made suitable for digital signal processing or for communication purposes.

10 Claims, 4 Drawing Figures

APPARATUS FOR OPTIMAL DATA STORAGE

BACKGROUND OF THE INVENTION

Many complex information systems must handle vast amounts of data to be analyzed and processed or stored. Those systems which are known to periodically sample several hundred input channels such as dispersive electrical transducer networks or acoustic lines require bulk storage methods for initial storage loading and subsequent readout. For example, a satellite must rapidly burst down large blocks of accumulated data to a tracking station for procesing while the satellite is over the station. However, conventional information systems such as those which employ multichannel storage techniques involving numerous magnetic tapes or discs do not allow for a fast enough replay for digital processing in a timely manner to match the increased amounts of data to be stored and therefore require extra mass secondary storage arranged for fast access.

One attempt to solve the above problem is through a "signal compression" technique. A memory device has been employed having two different scan speeds for the recording and replay of signals respectively. Thus, all frequencies can be raised proportionately with the ratio to the speed up. However, with the present techniques, the ratio of the scan speeds can not be excessive, while the expense was relatively high and the number of storage media utilized (e.g., discs) was large and bulky.

A second technique has been to sample short segments of the input channels and to reassemble only a portion of those segments by chopping out the gaps between the data. Although there is no frequency shift with acceleration as in signal compression, chopping may occur indiscriminately and without regard to the individual pulse periods, thus, duplicating portions of the pulse periods or causing the reassembled waveform to be of poor quality.

It would therefore be desirable to have a system for packing data into a storage medium to achieve optimal data storage and most efficient use of the storage medium. It would also be desirable to use existing analog and digital techniques in combination and with time compression, frequency expansion methods while taking advantage of wide band performance in available equipment to most effectively utilize the storage space capabilities of the storage medium.

SUMMARY OF THE INVENTION

Apparatus is disclosed for optimally storing data which may include a multiplexer for receiving a plurality of input analog channel signals to be sampled and multiplexed. An analog to digital converter, which is responsive to a control circuit, converts the multiplexed signals to digital signals in order to serially write the digital signals into a first storage device at a first digital word rate $f_i$. In the preferred embodiment, the first storage device is a conventional scratch pad memory. The digital signals are then read out of the first storage device and into a digital to analog converter at a second digital word rate $f_s$ where the signals are converted back into analog signals having a particular analog bandwidth that is determined by the second digital word rate $f_s$. In the preferred embodiment, the first digital word rate $f_i$ is less than the second digital word rate $f_s$. A second storage device, which may be a magnetic disc or tape recorder, is also responsive to the control circuit to store the output analog signals of the digital to analog converter. According to the instant invention, the bandwidth of the analog signals to be stored in the second storage device is made to be substantially equal to the maximum available bandwidth of the second storage device by means of adjusting the second digital word rate $f_s$ accordingly. Means are then provided to write the stored signals out of the second storage device and in a form which can subsequently be utilized to either reconstitute the input analog signals or to be suitable for digital signal processing, such a spectral analysis or filtering.

To reconstitute the input analog signals from the recorded signals stored in the second storage device, circuit means are provided to read the signals out of the second storage device and to post process the signals back through an analog to digital converter, a scratch pad memory device and a digital to analog converter with the effect of decreasing the digital word rate which can be written out of the scratch pad memory device and into the digital to analog converter. The output analog signals from the digital to analog converter may then be demultiplexed to resemble the analog signals of the input sample signals for each channel.

DESCRIPTION OF PREFERRED EMBODIMENT

Figure 1:
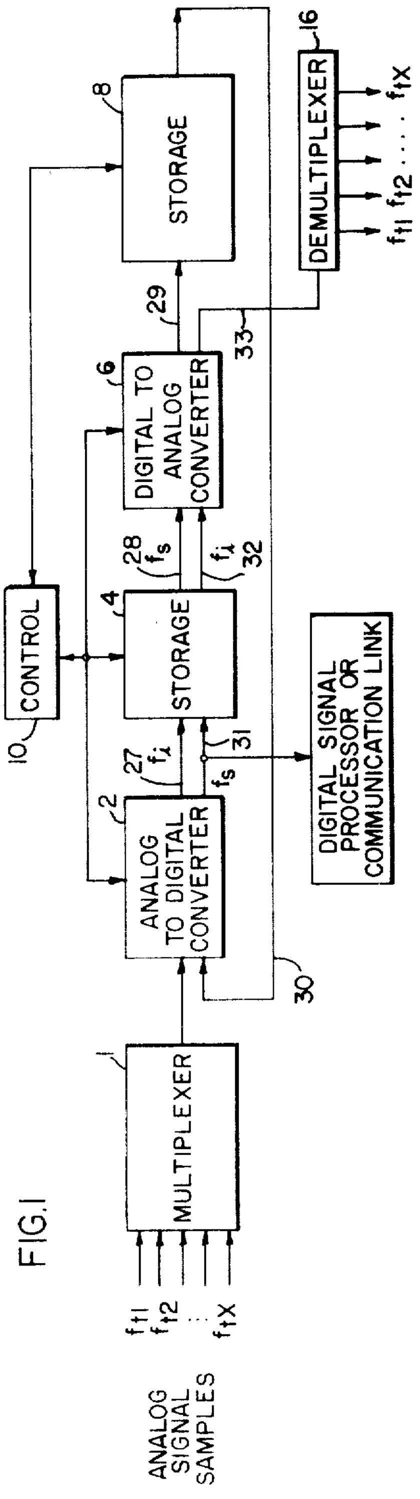
FIG. 1 is a block diagram of the apparatus of the instant invention which is used to achieve optimal data storage.
Figure 4:
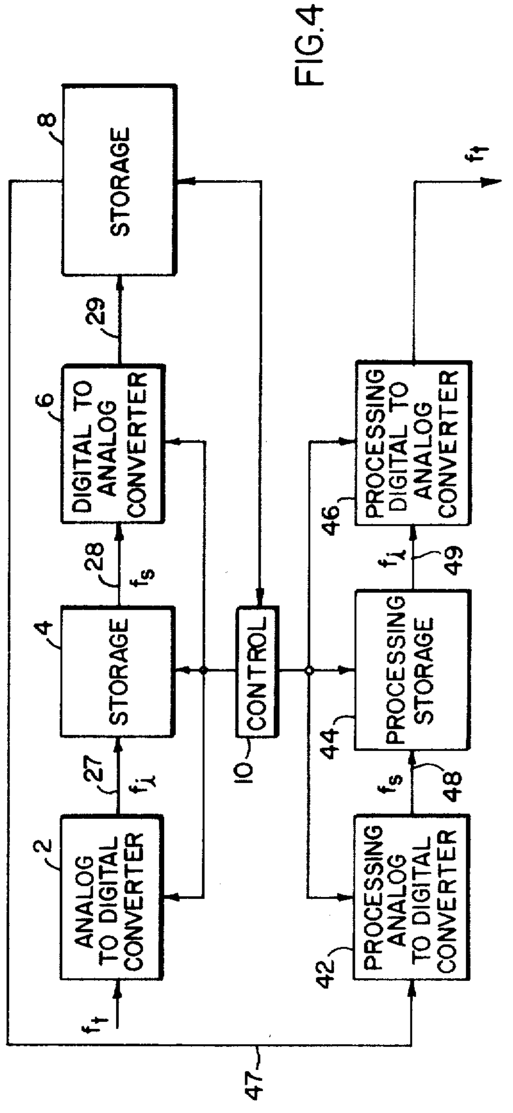
FIG. 4 is an alternate embodiment of the instant invention.

Referring to FIG. 1 of the drawings, a block diagram is shown of the apparatus for achieving an optimal information storage. The analog samples to be processed may originate from a plurality of discrete analog signal channels, such as that found in an acoustic transducer array or microphone network or from a satellite sensor network. Each channel supplies an analog signal having an analog frequency $f_{i1}$, $t_{i2}$, ..., $f_{ix}$ which may be in the order of $10KH_z$. Generally, each channel is sampled at a rate of twice the information bandwidth, and the analog channels are then multiplexed by suitable multiplexer means 1 into an n bit conventional analog to digital converter 2 for converting or digitizing a voltage or electrical analog signal into a digital representation. One example of an analog to digital converter currently available which would be suitable for receiving the plurality of discrete analog signal channels of the instant invention is the Micro Consultants Ltd. Analog to Digital Converter Model No. AN-DI 802 RAD. Multiplexing is required where it is necessary to time share converter 2 when many input channels must be sampled. However, it should be pointed out that when applying the instant invention to the storing of video signals, such as where it is desired to employ minimum amounts of magnetic tape to store signals for television playback, the multiplexing and sensor apparatus can be eliminated and only one continuous analog channel used, as is shown in FIG. 4. The analog to digital converter 2 is responsive to a control circuit 10 to sample and convert the analog signals to digital signals and thereafter write the digitized signals into a first storage device 4. The control circuit, which will be described in more detail hereinafter, in the simplest form, can be either a synchronous or asynchronous read/write controller which is well known and available in the art.

In the preferred embodiment, the first storage device 4 is a temporary, scratch pad data memory which may be capable of multiple scan speeds. Scratch pad memory 4 can be randomly accessed while having a short cycle time, which ideally would require it to be of the semiconductor type. A presently available high speed, random access memory plane array which may have application as the scratch pad memory 4 of the instant invention is that manufactured by Monolithic Memories, Inc., Series MM 4/3. Signals are written into the scratch pad memory 4 over a line 27 at a first digital word rate $f_i$. A scratch pad controller 12 (shown in FIG. 2) can be programmed to determine when scratch pad memory 4 is ready to receive the raw data bits and when the data has been completely loaded therein. Scratch pad controller 12 may include a conventional real-time clock or a true elapsed time counter such as that having a preset value, and when the preset count is reached, an interrupt is generated to scratch pad 4. After the controller 12 is satisfied that the raw data has been written into scratch pad memory 4, the control circuit 10 causes data words to be read or burst out of memory 4 at a seond but increased digital word rate $f_g$ resulting in virtual time compression. To achieve optimal storage of the data bits, the ratio of the digital frequencies or word rates $f_g/f_i$ should be greater than unity. The control 10 enables the data stored within scratch pad memory 4 to be reorganized or sorted so that desired data words can be randomly accessed.

An alternate arrangement of scratch pad memory 4 to also obtain an effective time compression – digital frequency or word rate expansion would be to use a core type memory having a longer cycle time than the preferred semi-conductor type. With a core type memory (not shown), longer digital words comprising several data words are gated into storage 4. The data bits may then be read out into high speed dynamic shift registers (also not shown) from which the data is rapidly burst out to obtain the desired time compression.

Data bits being read out of storage 4 at an increased digital word rate $f_g$ are loaded upon command of the scratch pad controller 12 over a line 28 into a conventional digital to analog converter 6. A specific example of a high speed digital to analog converter which would be compatible with analog to digital converter 2 and scratch pad memory 4 for the processing of radar, sonar, television, or other video signals is the Micro Consultants, Ltd., digital to analog converter, Model No. DI-AN 802 RAD. Analog to digital and digital to analog converters 2 and 6 are well known and may be similar to those additionally shown in U.S. Pat. No. 3,634,625, issued Jan. 11, 1972 to K. P. Geohegan, Jr. et al., assigned to the present assignee. For explanatory purposes, each converter 2 and 6 of FIG. 1 is shown having two input and output lines, but it is to be understood that the invention may be successfully carried out by gating a converter input signals and output signals over single respective input and output lines. Digital to analog converter 6 is responsive to the control circuit 10 to first convert the digital data bits back into analog signals having a particular wide bandwidth that is determined by the second digital word rate $f_g$ and then to load the analog output into a second storage device 8 over a line 29. The greater the word rate $f_g$ is made, then proportionately, the larger will be a respective analog bandwidth. Storage device 8 is a permanent type memory, such as a magnetic disc or tape recorder. Such an available disc recorder which is suitable for recording the wideband analog output of converter 6 is an Ampex MD Series magnetic disc recorder.

In accordance with the instant invention and to increase the effective storage space of permanent type storage device 8, the particular bandwidth of the analog signals being loaded into storage device 8 is determined by the maximum available information bandwidth of the recording device 8. It is generally known that the system information capacity of rate of information transmission is directly proportional to the system bandwidth, therefore, for optimal storage, it is desirable that the compressed data signals have the highest bandwidth compatible with the data handling limitations of the system, or more particularly that the bandwidth of the processed analog signals should substantially equal the maximum available bandwidth of the recorder 8. Optimum recording efficiency will be achieved when the bandwidth of the processed analog signals is equal to the available bandwidth of the recorder, however, as the bandwidth of the processed analog signals exceeds or falls short of the maximum bandwidth of the recorder, the recording efficiency will be decreased with a corresponding signal degradation.

Figure 2:
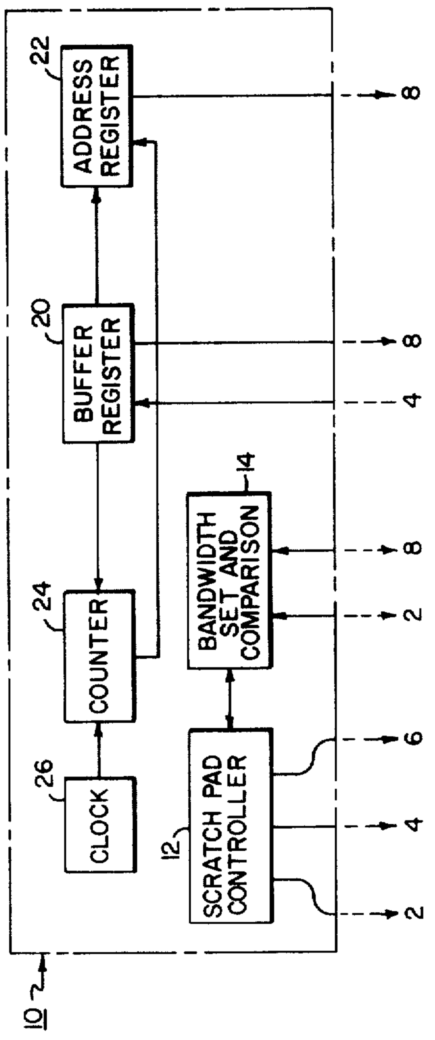
FIG. 2 is a more detailed block diagram of the control portion of the apparatus of FIG. 1.

For an optimum storage feature, the larger the storage bandwidth of the recorder 8, the more rapid must be the cycle time rate of scratch pad memory 4. As previously disclosed, each input analog channel is sampled at a rate of twice the information bandwidth, and therefore, to preserve the data and avoid signal degradation which could otherwise result, it is necessary that the cycle time rate of scratch pad memory 4 should be at least twice the maximum available bandwidth of the recorder 8. In order to expand the analog information bandwidth to match that of the recorder, it is necessary to regulate the ratio of the digital word rates $f_g/f_i$ accordingly and in relation to the available bandwidth of storage device 8. This function can be suitably accomplished by a bandwidth set and comparison stage 14, which comprises a portion of the control 10 (as best illustrated in FIG. 2). Set and comparison stage 14 which may conveniently be realized by a range of conventional high pass or band pass filters (not shown) compares the digital signals emerging from A-D converter 2 with regard to the available storage capabilities of recorder 8. The rate of digital data being burst out of scratch pad memory 4 can be consequently adjusted by scratch pad controller 12 to the digital word rate $f_g$, which, when converted to an analog representation by D-A converter 6, would produce the particular analog bandwidth corresponding to the maximum bandwidth of the recording medium 8.

The control circuit 10 may be modified depending upon whether a synchronous or asynchronous control is elected. If a synchronous control is utilized, as illustrated in the block diagram of FIG. 2, scratch pad controlled 12 determines when scratch pad memory 4 is in a ready mode to receive the data bits from A-D converter 2. It is then desired to write the information out of memory 4 and into the permanent storage 8 and at a proper assigned address when storage space is currently available. The control circuit 10 may include, as is well known in the art, a buffer type register 20 into which all information passing from scratch pad memory 4 to magnetic recorder 8 is temporarily stored to prevent a destructive readout of memory 4. A memory address register 22 is utilized to keep track of the available addresses and to directly assign each data word held in the buffer register 20 a corresponding address on the recording medium 8. The memory address register 22 can be set through buffer register 20 or through counter 24. The counter initially contains the address of the next available storage space and can be sequentially incremented by a clock 26.

Figure 3:
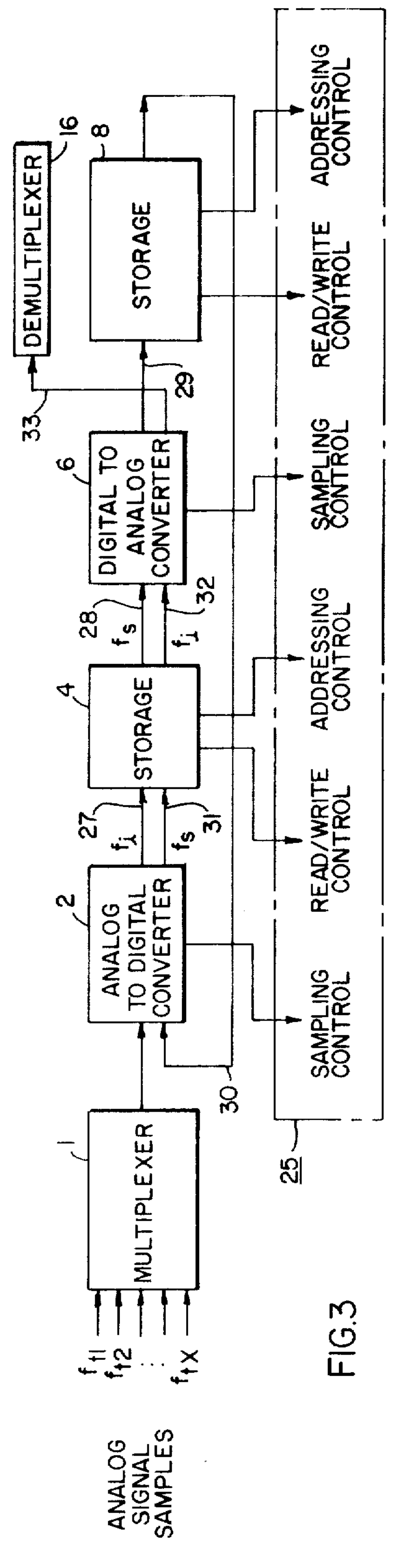
FIG. 3 is a block diagram of the apparatus of FIG. 1, but employing an alternate control portion.

Should the control be asynchronous, as illustrated in FIG. 3, the control block 10 (of FIG. 1) may be eliminated. Control could then be provided by an external computing device 25, which could be a small remote general purpose computer or corresponding hardware. Computer 25 would provide sampling, read/write, and addressing supervision, as shown, to place the magnetic recording means in a ready mode to receive data with the same effect as that provided by the synchronous control circuitry of FIGS. 1 and 2.

Data is recorded on storage medium 8 by frequency modulating a convenient radio frequency carrier such as at 13MH$_z$ with the analog data (that may have a frequency of 12.6 MH$_z$), which is a standard recording technique. A magnetic disc, which generally rotates at a speed of 3,600 RPM, may be sequenced by the control 10 so that a recording track is made available at the time when the digital data words are readout of scratch pad memory 4. Thus, when needed, the recorded data may be linearly read from a recording disc, and is properly organized for data processing. It has been found that the recorded data may be played back and data processed in the order of several hundred times faster than the original record time.

The 12.6 MH$_z$ analog data may be recovered by demodulating the FM of the recorded data. One well known applicable method of accomplishing the demodulation would be by a conventional frequency discriminator such as that utilizing a double-tuned circuit with transformer coupling, ballanced diodes and an associated R-C filter circuit serving as an envelope detector. Such a demodulating technique is more fully discussed in the book Information, Transmission, Modulation, and Noise, page 143, by Mischa Schwartz, 1959.

In one embodiment of the instant invention and as shown in FIG. 1, a circuit is provided to reconstitute the input analog signal samples from the demodulated recorded data signals. The demodulated analog data is fed over a first circuit means (line 30) back into A-D converter 2 where it is converted into digital signals. The digital signals are then read periodically (so as not to cause memory saturation) into scratch pad memory 4 over a second means (line 31) and at the second digital word rate $f_s$. Scratch pad memory 4 is responsive to the control 10 to write the data words out and into D-A converter 6 over a third circuit means (line 32) at the digital word rate $f_i$. The analog signals emerging from D-A converter 6 over a fourth circuit means (line 33) may then be demultiplexed by a suitable demultiplexer 16 in order to thereby reconstitute the original number of input analog signal sample channels at frequencies $f_{i1}, f_{i2}, \ldots, f_{ix}$ and without appreciable signal degradation. In the interest of cost savings, the analog signals were recovered by processing the signals from storage 8 through the same apparatus utilized for the original signal recording. However, it is within the scope of this invention, as illustrated in FIG. 4, to process the recorded signals from storage 8 by use of a second or processing A-D converter 42, a processing scratch pad memory 44, a processing D-A converter 46 and respective circuit means, lines 47, 48 and 49, which are substantially the same as those disclosed in FIG. 1, to obtain the same results. With regard to the embodiment of FIG. 4, control circuit 10 may be modified to sequentially control the aforementioned apparatus by suitable clock and gating means (not shown).

An alternate embodiment of the instant invention as shown in FIG. 1 can be carried out by using the compressed digital data bits on line 31 for continuous or fast replay digital signal processing (as shown in FIG. 1) rather than for reconstituting the input analog signal samples as previously described. The digital signal processing may include spectral analysis or filtering large blocks of compressed data in a short period of time and is taken from line 31, because data initially having a digital word rate $f_i$ is now, and in accordance with the instant invention, available at a much higher word rate $f_s$ which is a more desired form to obtain fast (i.e., instant) replay for signal processing or data transmission. One particular example of a signal processing technique which may be associated with the instant invention is to take the Fast Fourier Transform of the digital data on line 31 of FIG. 1, which is a technique well known in the art. Other modifications will be known to those skilled in the art.

I claim as my invention:

1. Apparatus for the storage of data from an input source of analog signal samples comprising:

a control means;

a first storage means for storing digital signals;

an analog to digital converter adapted to receive said analog signal samples and to convert said analog signals to digital signals, said analog to digital converter being responsive to said control means to write said converted digital signals into said first storage means at a first digital word rate $f_i$;

digital to analog converter means responsive to said control circuit to read said digital signals out of said first storage means at a second digital word rate $f_s$ and to convert said digital signals back into output analog signals having a particular analog bandwidth;

second storage means responsive to said control circuit to record the output analog signals of said digital to analog converter, said second digital word rate $f_s$ being chosen in accordance with the maximum information storage bandwidth of said second storage means whereby said particular analog bandwidth of said converted output analog signals will be substantially equal to the maximum information storage bandwidth of said second storage means; and means to process the recorded signals of said second storage means to thereby reconstitute the input analog signal samples.

2. The invention of claim 1, wherein the first digital word rate $f_i$ is less than the second digital word rate $f_s$.

3. The invention of claim 1, wherein said processing means to reconstitute said input analog signal samples from said recorded signals of the second storage means includes:

first circuit means to read said recorded signals out of said second storage means and back into said analog to digital converter, said analog to digital converter being responsive to said control means to convert the recorded analog signals from said second storage means to digital signals;

second circuit means to write said converted digital signals from said analog to digital converter into said first storage means at said digital word rate $f_s$; and third circuit means to read the digital signals out of said first storage means and into said digital to analog converter at said digital word rate $f_i$, said digital to analog converter being responsive to said control means to convert the digital signals from said first storage means back into analog output signals to thereby reconstitute the analog signals of said source of input samples.

4. The invention of claim 3, wherein said second circuit means includes digital signal processing means for said digital signals having said word rate $f_s$ and said digital signal processing means being a spectral analyzer.

5. The invention of claim 1, wherein said first storage means is a scratch pad memory.

6. The invention of claim 1, wherein said second storage means is a magnetic recorder.

7. The invention of claim 1, wherein the cycle time rate of said first storage means is at least twice the information storage bandwidth of said second storage means.

8. The invention of claim 1, wherein the control means includes a digital computer.

9. The invention of claim 1, including means to adjust said second digital word rate $f_s$ with respect to the maximum available information storage bandwidth of said second storage means to thereby cause said particular analog bandwidth to be substantially equal to the maximum information storage bandwidth of said second storage means.

10. The invention of claim 1, wherein said processing means to reconstitute said input analog signal samples from said recorded signals of the second storage means includes:

a processing analog to digital converter;

a processing storage means;

a processing digital to analog converter;

first circuit means to read said recorded signals out of said second storage means and into said processing analog to digital converter, said processing analog to digital converter being responsive to said control means to convert the recorded analog signals from said second storage means to digital signals;

second circuit means to write said converted digital signals from said processing analog to digital converter into said processing storage means at said digital word rate $f_s$; and third circuit means to read the digital signals out of said processing storage means and into said processing digital to analog converter at said digital word rate $f_i$, said processing digital to analog converter being responsive to said control means to convert the digital signals from said processing storage means back into analog output signals to thereby reconstitute the analog signals of said source of input samples.

* * * * *